No. 897,987.  
PATENTED SEPT. 8, 1908.  
E. J. MEZGER.  
MEASURING DEVICE.  
APPLICATION FILED JAN. 31, 1908.  
2 SHEETS—SHEET 1.
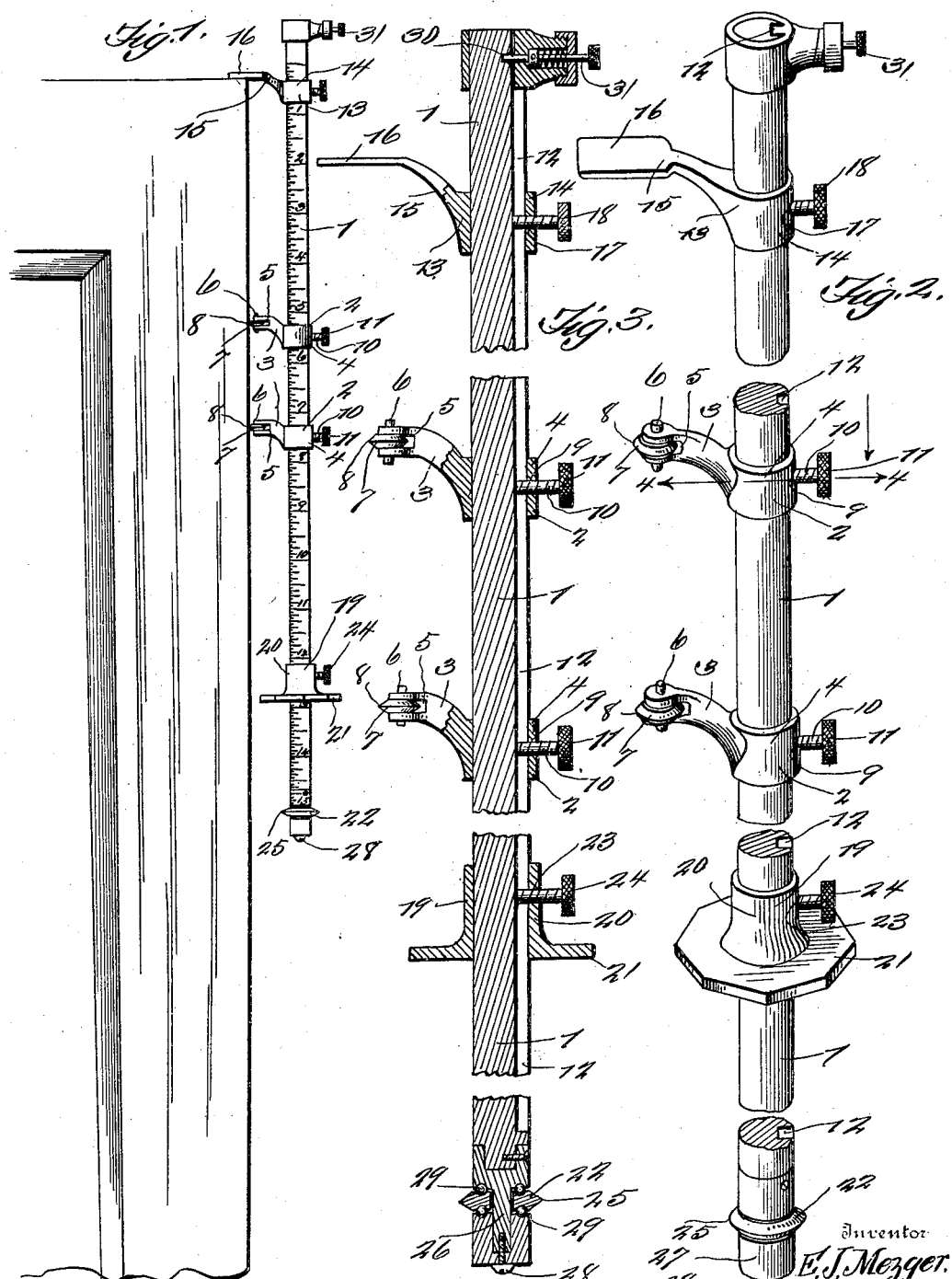

No. 897,987. PATENTED SEPT. 8, 1908.
E. J. MEZGER.
MEASURING DEVICE.
APPLICATION FILED JAN. 31, 1908.
2 SHEETS—SHEET 2.
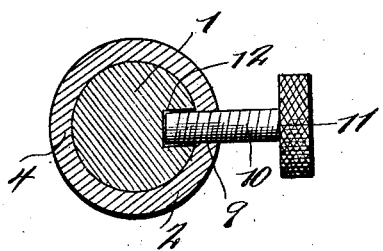
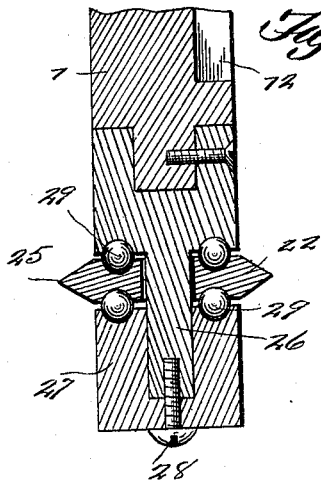
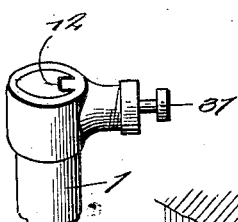
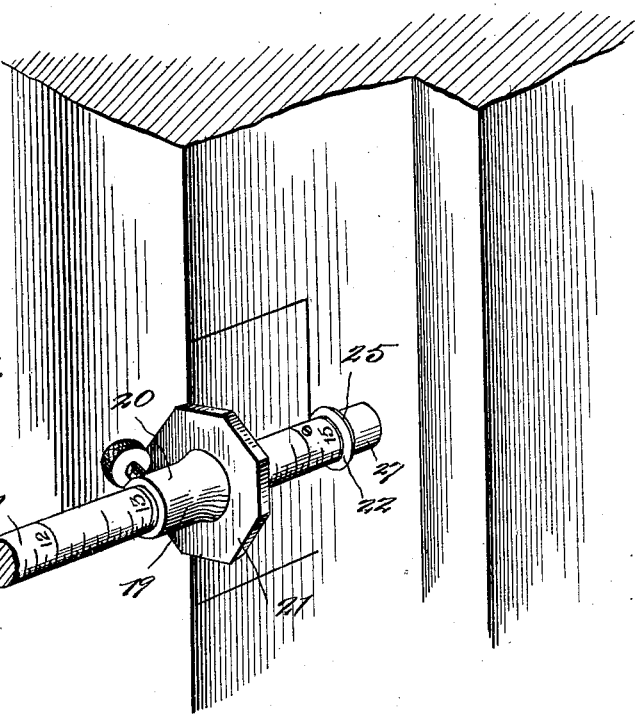
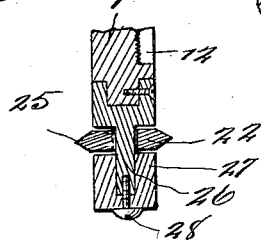
Witnesses
J. G. Boswell.
M. O. Bowling.
Inventor
E. J. Mezger.
By D. Swift & Co.
Attorneys

UNITED STATES PATENT OFFICE.

EUGENE J. MEZGER, OF YOLO, CALIFORNIA.

MEASURING DEVICE.

No. 897,987.  Specification of Letters Patent.  Patented Sept. 8, 1908.

Application filed January 31, 1908. Serial No. 413,578.

*To all whom it may concern:*

Be it known that I, EUGENE J. MEZGER, a citizen of the United States, residing at Yolo, in the county of Yolo and State of California, have invented a new and useful Measuring Device; and I do hereby declare the following to be a full, clear, and exact description of the invention, such as will enable others skilled in the art to which it appertains to make and use the same.

This invention pertains to a new and useful combination measuring device and door hanging gage; and the invention in its broadest latitude resides in an elongated rod, upon which is provided a plurality of graduations, ranging from one inch to as many inches as desired, preferably fifteen inches; and movably mounted upon this rod are members, to be adjusted, so as to gage the requisite distance from the top of a door and door jamb, for the placement of the door's upper hinge, as will be hereinafter set forth. These members are also used for gaging the requisite distance from the bottom of a door, for the position of the door's lower hinge, by reversing the entire device, that is, turning it end for end.

The invention directs as a further object, means for preventing rotation of said members, and means for preventing removal thereof, as will be hereinafter clearly manifest.

A further object of the invention resides in means for gaging the width of the cut-out in a door or door jamb, for receiving the leaves of hinges, as will be hereinafter evident.

This invention comprises further objects and combinations of elements which will be hereinafter more fully described, shown in the accompanying drawings, and the novel features thereof will be pointed out by the appended claims.

The features and elements and the arrangement thereof for accomplishing the objects of the invention, may be changed and varied, that is to say, in a practical application of the device, with an understanding that the changes and variations accruing from said application are limited to the scope of the appended claims.

To obtain a full and correct understanding of the details of construction, combinations of features, elements and advantages, reference is to be had to the hereinafter set forth description and the accompanying drawings in connection therewith, wherein Figure 1 is an elevation showing a door, and also illustrating the manner in which the measuring device and door hanging gage is utilized. Fig. 2 is an enlarged perspective view of the combination measuring device and door hanging gage. Fig. 3 is a sectional view longitudinally through the device. Fig. 4 is a sectional view on line 4—4 of Fig. 2. Fig. 5 is a sectional view of the lower end of the device. Fig. 6 is a perspective view of the upper part of the device, showing the means for preventing removal of the slidable member. Fig. 7 is a perspective view illustrating the manner in which the element 19 and the ring 22 coöperate for gaging the widths of cut-outs to receive leaves of hinges. Fig. 8 is a detail view of a modification.

Like reference characters are used for indicating similar features and elements throughout the several illustrations of the drawings.

In regard to the accompanying drawings wherein similar reference characters indicate corresponding parts in the several illustrations, by figures, 1 designates a rod, which may be of any desired length or width, and of any contour, that is, in cross section; movably mounted upon this rod are members 2, comprising arms 3 and sleeves 4, as clearly shown. The arms 3 are bifurcated at their outer ends, as at 5, and journaled in the arms formed by said bifurcations are the shafts or stub axles 6 of the marking or indicating wheels 7, which are provided with knife edges 8 about their circumferences. These knife edges are for the purpose of cutting into the door or door jamb, so as to mark or indicate the proper places for the leaves of hinges, as will be hereinafter clearly manifest.

The sleeves 4 are provided with apertures 9 having threads, which receive the shanks 10 of the thumb screws 11, which thumb screws extend entirely through one wall of said sleeve and engage a groove 12 of the said rod; this construction prevents rotary displacement of the said members, as will be clearly observed. Also carried by the rod 1 is an element 13, comprising a sleeve 14 and an arm 15, which arm terminates into a flat plate 16, which is for the purpose of engaging the top of a door or the bottom thereof, or to abut the upper jamb or the door sill, so as to allow the members 2 to be adjusted so as to gage the proper places for hinges, as will be hereinafter set forth in the operation and utility of the device. The sleeve 14 is provided with a threaded aperture 17 which receives the shank of the thumb screw 18, which shank engages the groove 12, as clearly shown in the drawings. Also movably mounted upon the rod 1 is a member 19 comprising a sleeve 20, about the circumference of which is a plate 21, which member is designed for coöperation with the indicating or marking ring 22, which will be hereinafter described. The sleeve 20 is also provided with a threaded aperture 23, designed for the reception of the shank of the thumb screw 24, which is for a similar purpose as that of the thumb screws 11 and 18, as will be clearly observed. The indicating ring 22 is provided with a knife edge 25 so as to cut into the door or jamb or other object, so as to indicate distances, widths or thicknesses, when gaged by the member 19. This indicating or marking ring is journaled upon a pintle 26 of the said rod, and held thereon by means of a washer 27 and a screw 28, as shown in the drawings. The said ring may have ball bearings if desired, as shown in the drawings, as at 29. At the upper portion of the rod 1, the groove thereof is provided with means 30, designed to receive an element 31, so as to prevent removal of the members 2, the member 19 and the element 13, as will be clearly manifest.

The operation and the utility of the device is set forth as follows:—When it is desired to gage the proper place for the upper hinge of a door, the element 13 is set so as the plate 16 will engage the upper edge of the door, after which the element 2 is set so that the marking wheel will mark the requisite distance from the upper edge of the door, for the upper edge of the hinge. The lower element 2 is then set so that its marking wheel will mark the height of the hinge, as clearly shown in Fig. 1. To indicate registering marks upon the jamb of the door, the plate 16 will be placed so as to abut the upper jamb of the said door, and while held in such a position, a slight movement is imparted to the device, which causes the wheels 7 of the elements 2, to make indications, that will register with the indications upon the door. For indicating the proper position of the lower hinge of a door, the device is reversed, that is, end for end, and after which the procedure is similar to that as above indicated. The thickness of the plate 16 will allow for clearance between the upper edge of the door and its jamb. The revolving ring and the member 19 are used for gaging the width of cut-outs, which receive the leaves of hinges. This is accomplished by setting the member 19 a distance from the said ring 22, equal to the width of the leaf of a hinge, and then use the device, as shown in Fig. 7 of the drawings. By the use of this device, handling of a door is obviated, that is, after the door is once fitted to an opening, until the door is placed upon hinges.

From the foregoing, the essential features, elements and the operation of the device, together with the simplicity thereof, will be clearly apparent.

Having thus fully described the invention, what is claimed as new and useful, by the protection of Letters Patent, is:—

1. In a combination device for the purpose specified, an elongated solid rod having graduations, slidable members carried by the rod two of which comprise sleeves having arms provided with bifurcations, marking wheels having knife edges mounted in said bifurcations, while one of the other members comprises a sleeve having a plate projecting laterally and parallel with the said arms, and thumb screws for holding the members in adjusted position, and removable means carried by each end of said rod to prevent accidental displacement of the members.

2. In a combination device for the purpose specified, an elongated solid rod having graduations and provided with a groove, slidable members carried by the rod two of which comprise sleeves having arms provided with bifurcations, marking wheels having knife edges mounted in said bifurcations, while one of the other members comprises a sleeve having a plate projecting laterally and parallel with the said arms, another of said members comprises a sleeve having about its lower periphery a polygonal shaped plate and thumb screws mounted in each sleeve of the members for holding the members in adjusted position, a revolving ring carried at the lower end of said rod, a washer and screw for holding the ring to the rod, said ring, washer and screw acting as means to prevent accidental displacement of the members from one end of the rod, a ring carried by the upper end of the rod provided with a hollow offset having a tongue to be received by said groove, said hollow offset having a spring pressed pin, said groove having a recess to receive said spring pressed pin, so as to prevent displacement of the members from the upper end of the rod.

3. In a combination device for the purpose specified, an elongated solid rod having graduations and provided with a longitudinal groove, slidable members carried by the rod two of which comprise sleeves having arms provided with bifurcations, marking wheels having knife edges mounted in said bifurcations, while one of the other members comprises a sleeve having a plate projecting laterally and parallel with the said arms, another of said members comprises a sleeve having about its lower periphery a polygonal shaped plate, and thumb screws mounted in each sleeve of the members and adapted to engage the groove for holding the members in adjusted position and to prevent rotary movement of the members, a revolving ball bearing marking ring carried at the lower end of said rod and a washer and screw for holding said ring to the rod, said ring, washer and screw acting as means for preventing displacement of the members from the lower end of said rod.

4. In a combination device for the purpose specified, an elongated solid rod having graduations, and provided with a longitudinal groove, slidable members carried by the rod, two of which comprise sleeves having arms provided with bifurcations, marking wheels having knife edges mounted in said bifurcations, while one of the other members comprises a sleeve having a plate projecting laterally and parallel with said arms and thumb screws mounted in each sleeve of the members and adapted to engage the groove for holding the members in adjusted position and to prevent rotary movement of the members, and removable means carried by each end of said rod to prevent displacement of the members.

5. In a combination device for the purpose specified, an elongated solid rod having graduations and provided with a longitudinal groove, slidable members carried by the rod, two of which have marking wheels provided with knife edges, and thumb screws mounted in each sleeve of the members and adapted to engage the groove for holding the members in adjusted position and to prevent rotary movement of the members, the lower end of said rod having removable means to prevent displacement of the members from said end, the upper end of said rod having a ring provided with a hollow offset having a tongue to be received by said groove, said groove having a recess, said offset having a spring pressed pin to engage said recess to prevent displacement of the members from the upper end of said rod.

6. In a combination device for the purpose specified, an elongated solid rod having graduations and provided with a longitudinal groove, slidable members carried by the rod, two of which have marking wheels provided with knife edges, thumb screws mounted in each sleeve of the members and adapted to engage the groove for holding the members in adjusted position and to prevent rotary movement of the members, and removable means carried at the upper end of said rod and engaging the groove to prevent accidental displacement and removal of the members.

7. In a combination device for the purpose specified, an elongated solid rod, slidable members carried thereby, two of which have marking wheels provided with knife edges, another of said members being provided with a polygonal shaped plate, thumb screws for holding the members in adjusted position, and a ball bearing revolving marking ring carried by the lower end of said rod, said ring acts as removable means to prevent the members from accidental displacement from the lower end of said rod, and removable means having a spring pressed pin to prevent displacement of the members from the upper end of said rod, said rod having a recess to receive said spring pressed pin.

8. In a combination device for the purpose specified, an elongated solid rod having graduations, slidable members carried thereby, one of which comprises a sleeve having about its lower periphery a polygonal shaped plate, a thumb screw mounted in said sleeve to engage the rod and a ball bearing revolving marking ring carried at the lower end of said rod, and removable means carried by the upper end of said rod to prevent accidental displacement of the members.

9. In a combination device for the purpose specified, an elongated solid rod having graduations, slidable members carried thereby, one of which comprises a sleeve having about its lower periphery a polygonal shaped plate, a thumb screw mounted in said sleeve to engage the rod, a ball bearing revolving marking ring carried at the lower end of said rod and a washer and screw for holding the ring to the rod, said ring, washer and screw acting as removable means to prevent the members from accidental displacement from the lower end of said rod.

10. In a combination device for the purpose specified, an elongated solid rod having graduations and provided with a longitudinal groove, slidable members carried thereby, one of which comprises a sleeve having about its lower periphery a polygonal shaped plate, a thumb screw mounted in said sleeve to engage the rod, a ball bearing revolving marking ring carried at the lower end of said rod and a washer and screw for holding the ring to the rod, the upper end of said rod having a removable ring provided with a hollow offset having a tongue to be received by said groove, said groove having a recess, said hollow offset having a spring pressed pin to engage said recess to prevent accidental displacement of the members from the upper end of said rod, and means for gaging the tension of the spring and guiding said pin.

11. In a combination device for the purpose specified, an elongated solid rod having graduations and provided with a longitudinal groove, slidable members carried thereby, one of which comprises a sleeve having about its lower periphery a polygonal shaped plate, a thumb screw mounted in said sleeve to engage the groove of the rod, a ball bearing revolving marking ring carried at the lower end of said rod, a washer and screw for holding the ring to the rod, and means carried at the upper end of the rod and adapted to engage the groove to prevent accidental displacement and removal of the members, and a removable ring having a spring pressed pin carried by the upper end of said rod to prevent accidental displacement of the members from said end, said groove having means to be engaged by said pin.

12. In a combination device for the purpose specified, an elongated solid rod having graduations and provided with an elongated groove, a member carried by the rod comprising a sleeve having about its lower periphery a polygonal shaped plate, a thumb screw mounted in said sleeve to engage the rod, a ball bearing revolving marking ring carried at the lower end of said rod to coöperate with said plate, and a washer and screw to hold the said ring to the rod, the upper end of said rod having removable means provided with a tongue to engage said groove to prevent accidental displacement of the members from said end.

13. In a combination device for the purpose specified, an elongated solid rod having graduations and provided with a longitudinal groove, slidable members carried by the rod, two of which comprise a sleeve having arms provided with bifurcations, marking wheels having knife edges mounted in said bifurcations, one of the other of the members comprising a sleeve having a plate projecting laterally and parallel with said arms, another of said members comprises a sleeve having about its lower periphery a polygonal shaped plate, and a thumb screw mounted in each sleeve of the members and adapted to engage the groove for holding the members in adjusted position and to prevent rotary movement of the members, removable means carried by the upper end of the rod and adapted to engage the groove to prevent accidental displacement and removal of the members, a ball bearing revolving marking ring having a knife edge revolubly carried at the lower end of the rod adapted to coöperate with the polygonal shaped plate, and a washer and a screw for holding the said ring to the rod, said ring, washer and screw act as removable means to prevent the members from accidental displacement from the lower end of said rod.

In testimony whereof I have signed my name to this specification in the presence of two subscribing witnesses.

EUGENE J. MEZGER.

Witnesses:
GEORGE KNOX,
EDGAR POCKMAN.